United States Patent [19]

Shroyer

[11] Patent Number: 4,514,959

[45] Date of Patent: May 7, 1985

[54] APPARATUS AND METHOD FOR ALIGNING AND PACKAGING ELONGATED ARTICLES

[75] Inventor: David Shroyer, Aurora, Oreg.

[73] Assignee: Lamb-Weston, Inc., Portland, Oreg.

[21] Appl. No.: 376,515

[22] Filed: May 10, 1982

[51] Int. Cl.³ .................. B65B 9/10; B65B 13/20; B65B 63/02

[52] U.S. Cl. .................. 53/428; 53/437; 53/451; 53/502; 53/504; 53/525; 53/552; 198/382; 221/172

[58] Field of Search .......... 53/525, 236, 544, 148, 53/443, 428, 437, 502, 504; 198/382; 53/552, 451; 221/156, 171, 172

[56] References Cited

U.S. PATENT DOCUMENTS

| | | | |
|---|---|---|---|
| 952,512 | 3/1910 | Clinton. | |
| 2,236,890 | 4/1941 | Bower et al. | 53/525 |
| 2,549,322 | 4/1951 | McKinsey | 53/525 |
| 2,632,588 | 3/1953 | Hoar, Jr. | 53/525 X |
| 2,679,312 | 5/1954 | Dean | 198/33 |
| 2,710,712 | 6/1955 | Friedman | 53/236 X |
| 2,753,976 | 7/1956 | Fitzmaurice | 198/33 |
| 3,027,699 | 4/1963 | Miller et al. | 53/236 |
| 3,056,485 | 10/1962 | Liberty | 198/135 |
| 3,426,503 | 2/1969 | Sherrill | 53/124 |
| 3,465,497 | 9/1969 | Tatibana | 53/246 |
| 3,492,779 | 2/1970 | Russell | 53/59 |
| 3,492,782 | 2/1970 | Gerding | 53/126 |
| 3,535,847 | 10/1970 | Strohmeier et al. | 53/59 |
| 3,592,324 | 7/1971 | Caunt | 198/382 |
| 3,633,732 | 1/1972 | Russell et al. | 198/40 |
| 3,712,019 | 1/1973 | Lamka et al. | 53/29 |
| 3,774,782 | 11/1973 | Lewis | 214/6 D |
| 3,811,550 | 8/1972 | Ajero | 198/382 |
| 3,864,893 | 2/1975 | Murad | 53/59 R |
| 3,878,665 | 4/1979 | Couten | 53/143 |
| 3,895,479 | 7/1975 | Kastner | 53/148 |
| 3,903,672 | 9/1975 | Goglio | 53/24 |
| 3,940,908 | 3/1976 | Dazen et al. | 53/59 R |
| 3,990,213 | 11/1976 | Seragnoli | 53/59 R |
| 4,040,230 | 8/1977 | Pessell et al. | 53/24 |
| 4,094,123 | 6/1978 | Carlson | 53/24 |
| 4,149,355 | 4/1979 | Clegg | 53/448 |
| 4,183,192 | 1/1980 | Smaw | 53/77 |
| 4,203,269 | 5/1980 | Petersen | 53/77 |
| 4,209,959 | 7/1980 | Bachman et al. | 53/475 |
| 4,209,960 | 7/1980 | Deutschlander et al. | 53/502 |
| 4,211,054 | 7/1980 | Sramek | 53/502 |
| 4,250,690 | 2/1981 | Lorenzen et al. | 53/475 |
| 4,351,141 | 9/1982 | Glorfield et al. | 53/473 |

Primary Examiner—Horace M. Culver
Attorney, Agent, or Firm—Klarquist, Sparkman Campbell, Leigh & Whinston

[57] ABSTRACT

A plurality of elongated articles such as french fried potato strips are aligned with their longitudinal axes substantially parallel and packaged in such aligned condition by the apparatus and method of the invention. The articles are prealigned by a vibrating conveyor having longitudinal partitions dividing it into four tracks, so that the longitudinal axes of such articles are substantially parallel to their direction of travel which forms acute angle of about 45° with the front wall of an alignment container into which the articles are fed. The alignment container is vibrated at a different frequency than the vibrating conveyor in order to settle and to further align the elongated articles with their longitudinal axes substantially parallel to the front wall of such container. One end of the elongated article strikes the front wall of the alignment container and is pushed along such wall by the conveyor into more parallel alignment therewith before falling through the inlet opening of such container. The aligned articles are discharged from the alignment container into a weighing container after reaching a predetermined height, and are then weighed while additional elongated articles are conveyed into such weighing container by a second vibrating conveyor. When a predetermined weight is reached the contents of the weighing container are discharged as a batch into a packaging machine for packaging without disturbing the alignment of such articles. The packages of aligned articles are tipped slowly by a tipping means from a vertical filling position to a horizontal position on an outfeed conveyor.

26 Claims, 5 Drawing Figures

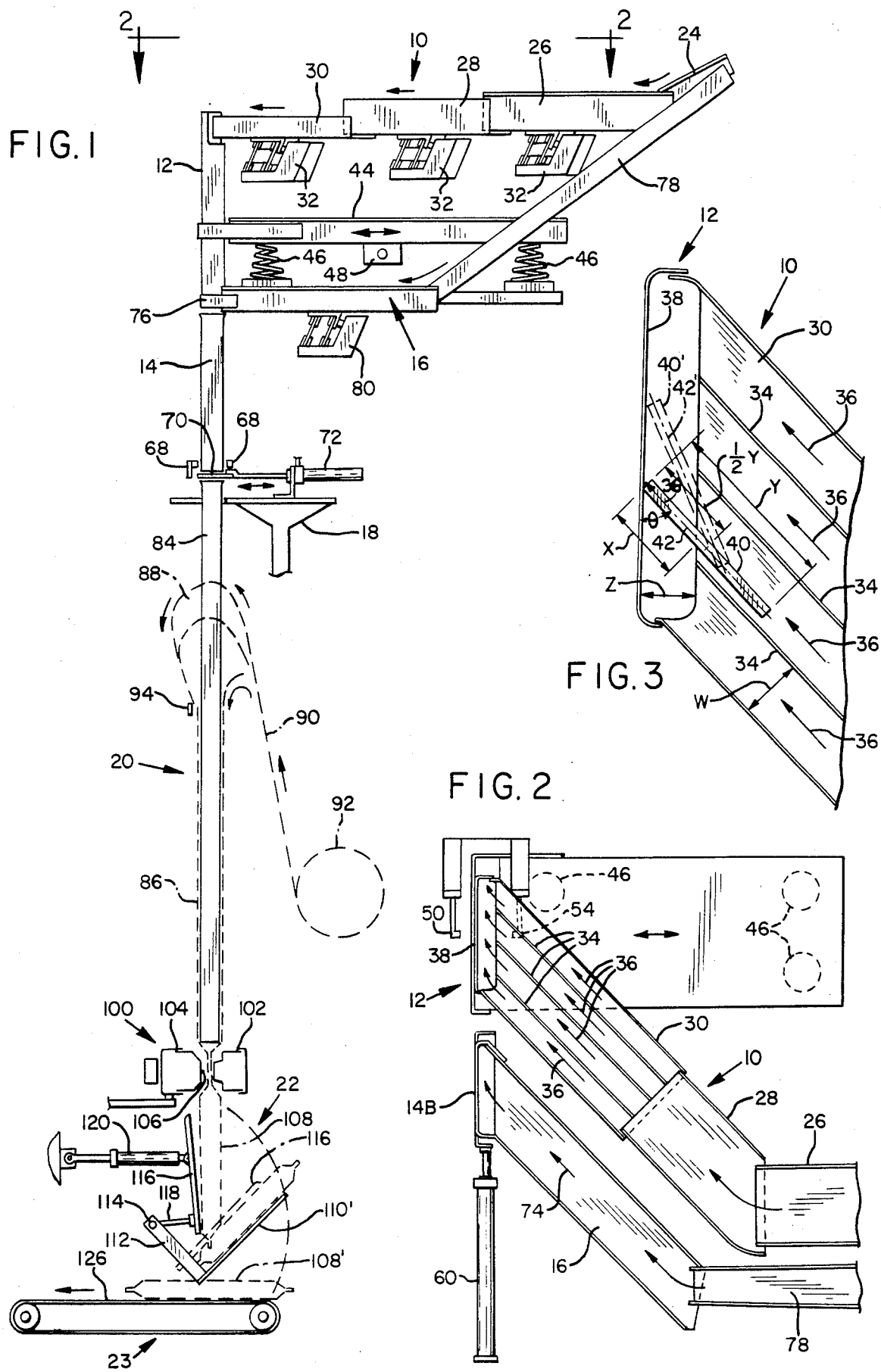

APPARATUS AND METHOD FOR ALIGNING AND PACKAGING ELONGATED ARTICLES

BACKGROUND OF INVENTION

The subject matter of the present invention relates generally to apparatus and method for aligning and packaging elongated articles, and in particular, to such apparatus and method in which the articles are prealigned by conveying them on a vibrating conveyor with their longitudinal axes parallel to their direction of travel which forms an acute angle with the front wall of an alignment container into which they are fed. The alignment container is also vibrated at a different frequency than the vibrating conveyor in order to further settle and align the elongated articles therein so that their axes extend substantially parallel to the front wall of such container.

The apparatus and method for aligning and packaging elongated articles in accordance with the present invention is especially useful for aligning and packaging food products, such as french fried potatoe strips which may be partially precooked and frozen as french fries are sold to fast food restaurants. As a result of such alignment and packaging, the same amount of product can be packaged in smaller bags and such bags can be shipped in smaller cartons so that more of such cartons can be stacked on a fork lift truck pallet and placed in unitized shipping containers for shipping in refrigerated trunks or rail road cars. Thus, a greater amount of product on the order of approximately 8 to 10% more can be packed in the same shipping space. There is less breakage of the product and a higher product quality since hand packing and unloading of the packages is avoided. Lass bag material is required for packaging and there is less air in the sealed bags which reduces spoilage and increases freezer storage time. While french fried potatoe strips are of different lengths and some are broken, about 80% of the packaged potato strips are aligned in the packages using the apparatus and method of the present invention. It should be noted that while french fried potatoe strips are partially cooked by oil blanching and frozen individually before alignment and packaging, other elongated food products, such as string beans, can be aligned and packaged using the present invention without cooking and/or freezing.

It has been previously proposed in U.S. Pat. No. 4,094,123 of Carlson, issued June 13, 1978 to provide an apparatus and method for aligning elongated articles by employing a plurality of barrier gates which extend transversely across a vibrating conveyor so that the articles are aligned with such gates transversely to the longitudinal axis of the conveyor. The articles are moved along the conveyor from one gate to another for further alignment and eventually discharged from such conveyor into a packaging machine. Unlike the present invention, the elongated articles are not conveyed into an alignment container with their longitudinal axes prealigned parallel to their direction of travel which forms an acute angle with the back wall of an alignment container. Instead, the articles are fed in a direction of travel substantially perpendicular to the barrier gates and are aligned on the vibrating conveyor with their axes perpendicular to the axis of the conveyor. The aligned articles are then discharged individually from the conveyor into the packaging machine which disturbs their alignment. Furthermore, the prior vibrating conveyor with the barrier gates attached thereto conveys the articles from gate to gate only after the gate is raised so that it conveys the articles across such conveyor at a much slower rate, thereby increasing the alignment and packaging time.

U.S. Pat. No. 2,753,978 of Fitzmaurice, issued July 10, 1956, shows an aligning conveyor system in which logs are aligned by conveying them against a deflector which extends diagonally across the conveyor and funnels the logs into an outlet opening of a small size adapted to pass only one log at a time. The logs are discharged from such conveyor onto an alignment unit which feeds the logs onto an outfeed conveyor with the axis of such logs perpendicular to the direction of travel of such outfeed conveyor. Unlike the present invention, the elongated articles are not fed on a vibrating conveyor to prealign the elongated articles with their axes substantially parallel to the direction of travel. Also, logs are not conveyed in a direction of travel which makes an acute angle with the front wall of an alignment container into which such logs are deposited for further alignment and settling by the vibration of such alignment container in accordance with the present invention.

It is old to provide an apparatus for aligning and packaging articles in which such articles are automatically weighed and aligned before packaging using a vibrating conveyor, as shown in U.S. Pat. No. 3,056,485 of Liberty, issued Oct. 2, 1962. However, in this patent the articles are weighed before alignment. Also, the articles are not prealigned on a vibrating conveyor and fed in a direction of travel which forms an acute angle with the front surface of an alignment container into which they are fed and which is also vibrated in the manner of the present invention. The use of a photocell light beam detector to count articles or determine the level of articles in a container is old in an aligning and packaging apparatus as shown by U.S. Pat. No. 3,492,779 of Russell, issued Feb. 3, 1970 and U.S. Pat. No. 3,535,847 of Strohmeier et al, issued Oct. 27, 1970.

SUMMARY OF THE INVENTION

It is therefore one object of the present invention to provide an improved apparatus and method for aligning elongated articles in a fast, accurate and efficient manner.

Another object of the invention is to provide such an apparatus and method in which the elongated articles are prealigned on a vibrating conveyor in a plurality of parallel tracks and conveyed with their longitudinal axes substantially parallel to the direction of travel which forms an acute angle with the front wall of an alignment container into which such articles are fed, in order to align such articles in such container with their axes parallel to the front wall of such container.

A further object of the invention is to provide such an alignment apparatus and method in which the alignment container is vibrated at a different frequency from that of the vibrating conveyor for more efficient alignment and settling of the articles in the alignment container.

An additional object of the invention is to provide such an apparatus and method for aligning and packaging the aligned elongated articles into packages of smaller volume to reduce the amount of packaging material required, to remove more air from the packages for reducing spoilage and increasing freezer storage time, and to reduce the size of shipping cartons in which such packages are transported thereby saving shipping costs or increasing the amount of product which can be shipped within a given shipping space.

Still another object of the invention is to provide such an apparatus and method in which the aligned articles are discharged as a batch from the alignment container into a weighing container of the same cross-section which is moved onto a scale for weighing the aligned articles as additional articles are fed into the weighing container until a predetermined weight is reached, and then discharged into a package as a batch of aligned articles without disturbing their alignment, for faster, more accurate and efficient packaging.

A still further object of the invention is to provide such an apparatus and method in which the packages of aligned elongated articles are tipped from a vertical filling position into a horizontal position onto an outfeed conveyor without disturbing the alignment of their contents or the shape of such packages.

A still additional object of the invention is to provide such an apparatus and method in which french fried potatoe strips are the elongated articles which are aligned and packaged into packages of smaller size to enable shipping in unitized shipping containers, to prevent breakage and improve quality of the delivered product by eliminating manual packing and unloading.

DESCRIPTION OF DRAWINGS

Other objects and advantages of the present invention will be apparent from the following detailed description of a preferred embodiment thereof and from the attached drawings of which:

FIG. 1 is a side elevation view of an apparatus for aligning and packaging elongated articles in accordance with the present invention;

FIG. 2 is a top plan view taken along the line 2—2 of the apparatus of FIG. 1;

FIG. 3 is an enlarged view of a portion of FIG. 2 showing the alignment container and the vibrating conveyor feeding elongated articles into such container;

DESCRIPTION OF PREFERRED EMBODIMENT

Figure 4:
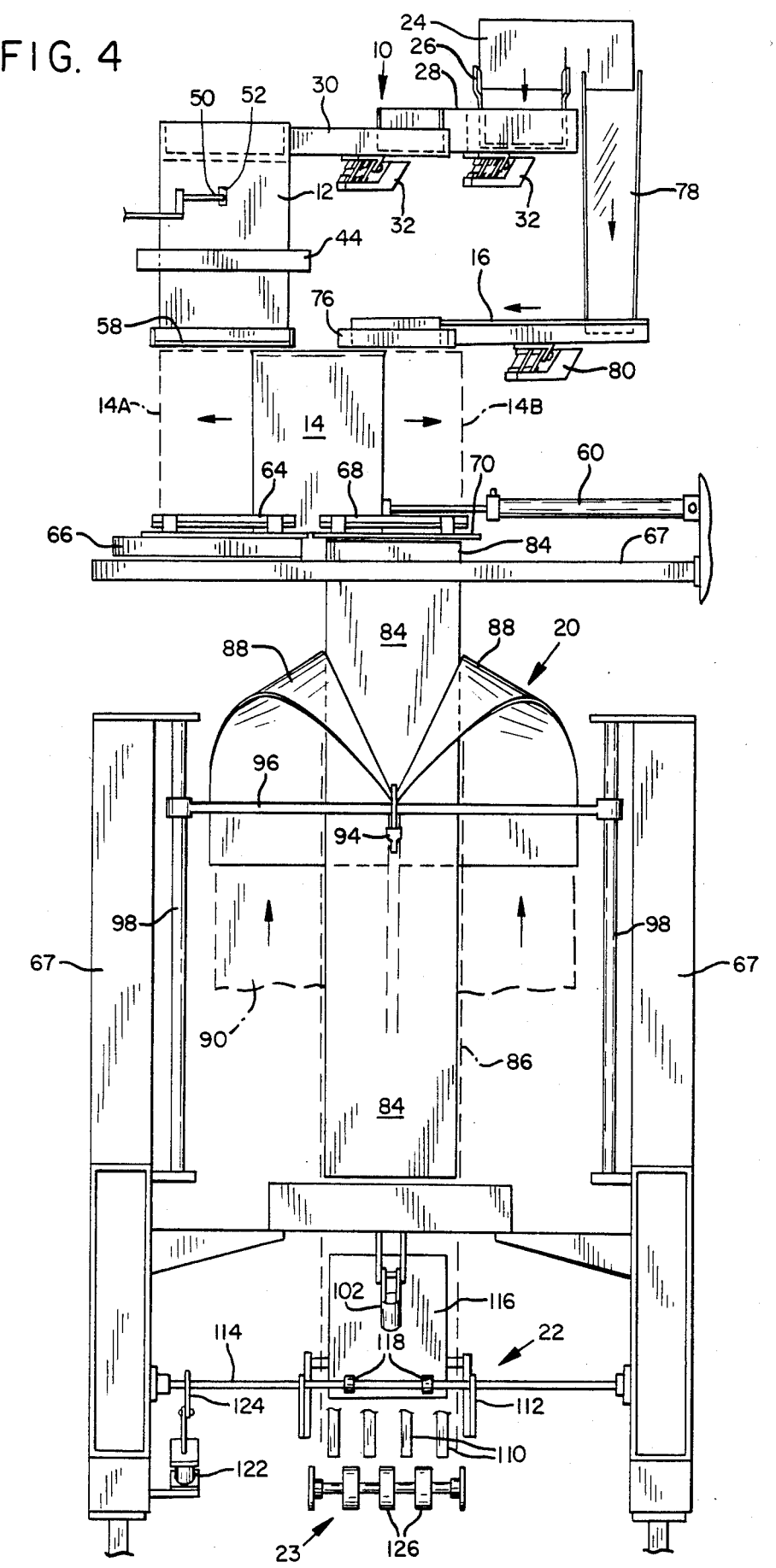
FIG. 4 is a front elevation view of the apparatus of FIG. 1.

As shown in FIGS. 1 to 4 the alignment and packaging apparatus of the present invention includes a first vibrating conveyor 10 for conveying elongated articles, such as french fried potatoe strips, into an alignment container 12. The aligned articles are discharged from the alignment container into a weighing container 14 in a load position 14A of such weighing container. The weighing container 14 is moved to a weighing position 14B where additional elongated articles are fed into the weighing container by a second vibrating conveyor 16 during weighing on a scale 18. When the weight of the weighing container and contents reaches a predetermined amount the second conveyor is stopped and the entire contents of aligned articles is discharged as a batch from the weighing container into a packaging machine 20. After packaging the filled packages are tipped from their vertical filling position by a tipping mechanism 22 into a horizontal position on an outfeed conveyor 23.

The french fried potatoe strips or other elongated articles are fed from a hopper (not shown) down a first discharge chute 24 onto a first stage 26 of the first vibrating conveyor 10. The elongated articles are conveyed along the first stage vibrating conveyor 26 onto a second stage vibrating conveyor 28, and finally into a third stage vibrating conveyor 30 before being fed into the alignment container 12. Each of the three conveyor stages 26, 28 and 30 has a separate vibrating conveyor drive 32 secured to the bottom thereof which may be an electromagnetic vibrating conveyor, such as a Syntron model F-TO1-A vibrating conveyor made by Syntron Company of Homer City, Pa., whose frequency of vibration is about 60 hertz or 3600 cycles per minute. The third stage 30 of the first vibrating conveyor includes a plurality of longitudinal divider members 34 which divide such conveyor longitudinally into four tracks, each having a width W less than the length Y of the elongated article corresponding to the minimum length of the french fried potatoe strips to prealign such articles with their longitudinal axes in parallel alignment with their direction of travel 36 on such conveyor stage.

As shown in FIGS. 2 and 3, each of the four tracks of the vibrating conveyor stage 30 conveys the elongated articles in direction of travel 36 which forms an acute angle $\theta$ with a front wall 38 of the alignment container 10 which is in the range of approximately 30° to 60° and is preferably about 45° for optimum results. One french fried potatoe strip or other elongated article 40 is shown in FIG. 3 prealigned with its longitudinal axis 42 substantially parallel to the direction of travel 36 of the article on such conveyor. In this prealigned condition the articles 40 are moved into engagement with the front wall 38 of the alignment container 12 so that one end of such article strikes the alignment container and moves along the surface of the front wall into the dashed line position 40' shown. In this position 40' the axis 42' of such elongated article is more nearly aligned parallel to the planar surface of the front wall 38 than in position 40. Thus, the angle between the longitudinal axis 42' and such front wall in position 40' is less than the angle $\theta$ between the front wall and the direction of travel 36 or the axis 42 of the prealigned article 40 on the conveyor 30.

As the elongated articles are pushed further along the front wall 38 of the alignment container 12, there becomes a point where the weight of the forward portion of the article overhanging the inlet opening at the top of the alignment container is greater than the rearward portion of the article overhanging the conveyor 30. When this condition occurs, the elongated article falls down into the alignment container 12. It should be noted that the distance X that the elongated object 40 extends over the inlet opening in the direction of travel 30 when it first contacts the front wall 38 of the alignment container must be less than one-half Y, the length of the elongated article. Thus, if the distance X were greater than one-half Y, the elongated article would fall into the alignment container before it hit the front wall 38 so that no further aligning of the article into parallel alignment with the front wall 38 would occur. The width Z of the inlet opening of the alignment container 12 is given by the expression $Z = X \cdot \sin \theta$. When the angle $\theta = 45°$, $Z = X \cdot \sin 45° = 0.707X$. Since $X < Y/2$ and $Z = 0.707X$, then Z is also much less than $Y/2$.

The alignment container 12 is attached to a shaker table 44 which is supported on coil springs 46 at its four corners. The shaker table is vibrated vertically and horizontally by a rotating eccentric weight vibrating mechanism 48. As a result, the shaker table 44 and the alignment container 12 which is rigidly attached thereto by welding, vibrate to shake the elongated articles within such container thereby settling the articles and further aligning such articles with their longitudinal axis substantially parallel to the front wall 38 of such container. It should be noted that the vibration means 44,46 for the alignment container 12 is separate from the vibration means 32 for the first vibrating conveyor 10. This enables the frequency of vibration of the alignment container 12 to be different from that of the vibrating conveyor and optimized for the elongated articles being aligned. Thus, for french fried potatoe strips having a square cross-section of about ¼ inch square, the optimum vibrating frequency of the alignment container 12 has been determined to be about 22 hertz, while the acceleration amplitude of such vibration should be about twice the force of gravity for optimum results.

Figure 5:
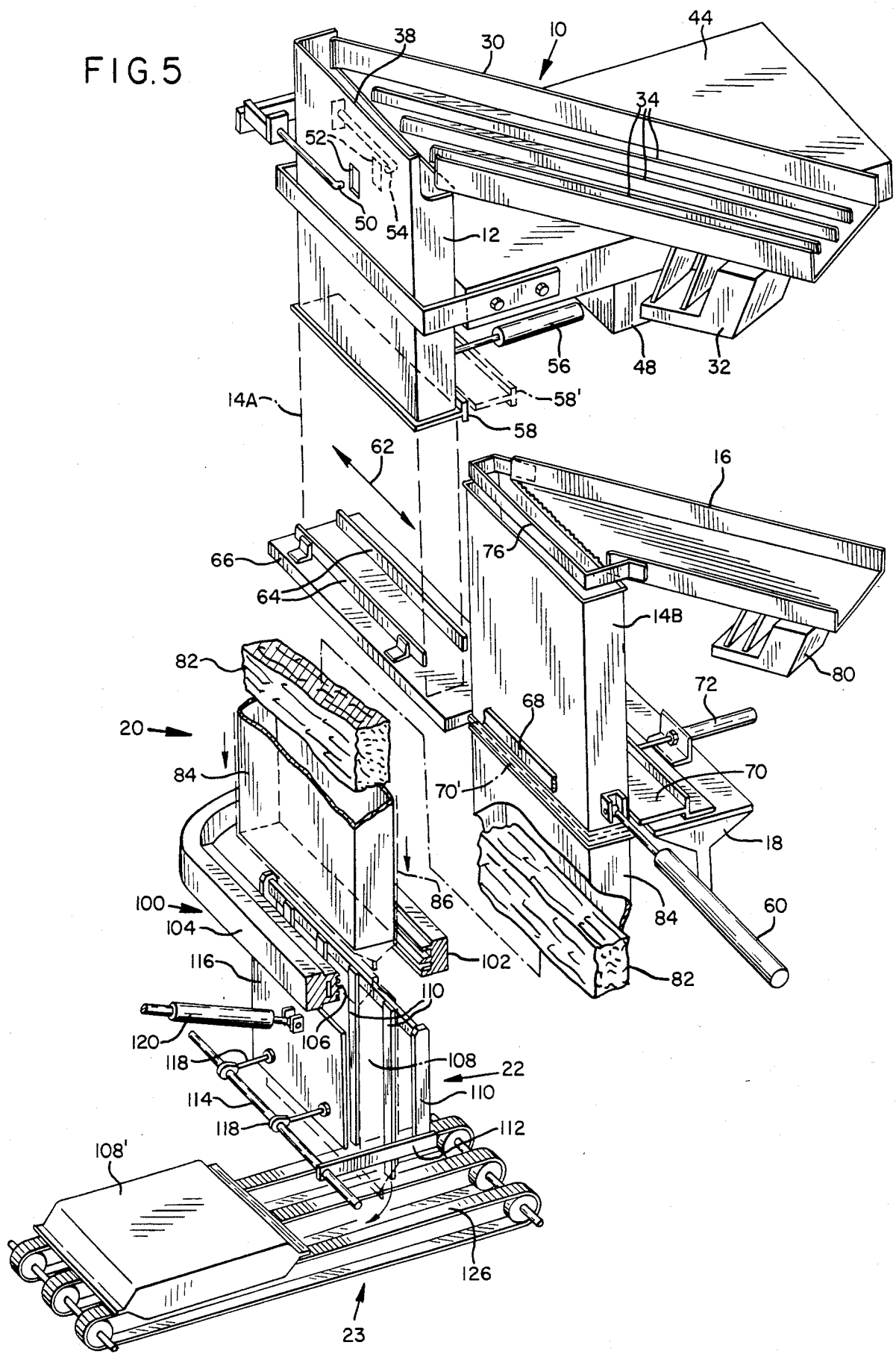
FIG. 5 is a perspective view of the apparatus of FIGS. 1 to 5 showing movement of the weighing container between the load and weighing positions and showing the packaging means partially offset from its actual location for clarity.

As shown in FIGS. 2 and 5, the level of the filling of elongated articles within the alignment container 12 is sensed by a level detector means including an external light source 50 which directs a light beam through windows 52 in the container wall across the width of the container to a photocell 54 on the opposite side thereof. When the filling of articles reaches a predetermined level they block the light beam from photocell 54 and cause it to produce an electrical output signal which actuates a solenoid valve controlling a discharge cylinder 56. The discharge cylinder then opens a discharge gate 58 normally an outlet opening in the bottom of the alignment container in order to discharge the entire contents of such container as a batch into the weighing container 14 when it is in the load position 14A. The rectangular cross-section of the weighing container 14 is of the same area and shape as the cross-section of the alignment container 14 so that the batch of aligned articles can be transferred to the weighing container without disturbing their alignment.

In order to weigh the contents of the weighing container 14, such container is moved from the load position 14A to the weighing position 14B by means of a cylinder 60 in the direction of arrows 62. The weighing container slides between a pair of spaced guide rails 64 which have their inner surfaces coated with nylon or other low friction material and are attached to a support plate 66 mounted beneath the alignment container on a frame 67. Another pair of spaced guide rails 68 is provided in alignment with rails 64 above a discharge gate 70 which normally closes an outlet opening in the lower end of the weighing container 14 in its weighing position 14B when such gate is slid into the closed position 70' by an operating cylinder 72. In the closed position 70' of the gate, such gate supports the weighing container and rests on the platform of the scale 28 to weigh the weighing container 14 and its contents.

A conventional electronic scale can be employed for scale 18 to weigh the weighing container 14, such as the scale made by Automatic Timing and Controls Company of King of Prussia, Pa., and sold as model ATC Series 6005C Weighing Cell. This scale includes a linear variable differential transformer for converting the weight on such scale into an electrical signal by movement of the core of such transformer in response to vertical displacement of the scale platform. However, any other suitable scale can be employed.

In its weighing position 14B additional elongated articles are fed into the top of the weighing container 14 by the second vibrating conveyor 16. These additional articles are fed on the conveyor 16 in a direction of travel 74 shown in FIG. 2 which forms an acute angle with the front wall of the weighing container 14, such front wall being in alignment with a substantially U-shaped stop bracker 76 welded to the end of the second conveyor 16. Thus, the additional elongated articles fed by the second vibrating conveyor 16 actually strike the stop bracker 76 rather than the front wall of the weighing container 14 and are urged along such stop bracket into more parallel alignment with the front wall of such weighing container before dropping into such container. This use of the stop bracket is necessary because the rear wall of the weighing container 14 must be the same height as its front wall. Thus, since the weighing container moves between the load position 14A and the weighing position 14B, the top of the weighing container must be flat to fit under and in close proximity to the bottom opening of the alignment container 12 in the load position. It should be noted that these additional elongated articles are fed onto the second conveyor 16 down a chute 78 from the hopper containing such articles. The second vibrating layer conveyor 16 is vibrated with an electromagnetic vibrator unit 80 similar to the vibrators 32 which vibrate the first conveyor 10.

When the weighing container 14 and its contents reach the predetermined weight set in the electrical circuit of scale 18, such scale produces an electrical output signal which actuates the operating cylinder 72 to open the discharge gate into the discharge position 70 shown in FIG. 5. In this manner the entire contents of the weighing container 14 is discharged as a batch 82 of aligned articles into a tubular metal chute 84 which conveys the batch of articles into the packaging machine 20 where they are dropped into a plastic tube 86 formed about such a packaging chute. The packaging machine 20 is a package forming and filling machine which includes a pair of forming members 88 over which plastic sheet material 90 is fed from a roll 92 of such sheet material and folded into the tube 86 as shown in FIGS. 1 and 4. A side seam heat sealing device 94 mounted on a moving support rod 96 seals the opposite edges of the folded plastic sheet together to close the sides of the plastic tube 86, as the support rod 96 is moved vertically along guide rails 98. The top and bottom ends of the bag are sealed by another heat sealing device 100 which includes a pair of clamp heater member 102 and 104 which pinch off and heat seal the plastic tube at the bottom to form two vertically spaced seals at the top and bottom of two successive bags. A knife blade 106 is provided on clamp heater member 104 between the two seal regions for cutting the finished bag 108 off the end of the plastic tube. The packaging machine 20 may be a vertical form and fill machine sold by Mira-Pak, Inc., of Houston, Tex., as Model K, Series 10,000.

The tipping apparatus 22 includes a support member having a plurality of spaced support arms, which is attached by a pair of end brackets 112 at the opposite ends thereof to a common pivot shaft 114 to rotate with such shaft. A side clamp plate 116 is pivotally attached to pivot about the support shaft 114 by a clamping cylinder 120 for clamping the bag 108 between the side plate and support member 110 in the vertical filling position of such bag. When tipping the bag to a horizontal position the clamp cylinder 120 is further extended causing the side plate 116 to pivot about the common pivot shaft 114 beyond the vertical position shown in FIGS. 1 and 5 in a clockwise direction. At the same time a tipping cylinder 122 shown in FIG. 4 whose piston rod is attached to a link 124 fixedly secured to the shaft 114, is actuated for rotating such shaft to cause rotation of the support bracket 112 and the support member 110 from a vertical position into the inclined position 110' shown in FIG. 1. Continued rotation of the shaft 114 by the piston 122 causes the support member arms 110 to move below the upper surface of an outfeed conveyor 126, thereby gently depositing the package 108 in a horizontal position 108' on the upper surface of such conveyor. Thus, the tipping apparatus 22 gently tips the package from the vertical filling position 108 into the horizontal outfeed position 108' without disturbing the alignment of the aligned articles contained within the package or changing the shape of the package. The outfeed conveyor conveys the packages to a work station where such packages are placed within shipping cartons that are stacked on a wood pallet for a fork lift truck.

Preferably, the packages 108 are 6 pound bags, six of which will fit in a cardboard carton having dimensions of 15 $\frac{1}{8}$ × 12$\frac{7}{8}$ × 12$\frac{7}{8}$ inches, such carton having a net weight of 36 pounds. These cartons are then stacked on a wooden pallet having an area of 40 inches × 48 inches in four rows of cartons with nine cartons per row, making a total of 36 cartons stacked on a pallet. This load is then carried by a lift truck and loaded into a unitized shipping container or into a refrigerated truck or rail road car. As a result, approximately 8 to 10% more product can be packaged in the same shipping space than before using the method and apparatus of aligning and packaging of the present invention.

It should also be noted that other means for moving the weighing container 14 can be utilized than cylinder 60. Thus, a plurality of such weighing containers can be mounted in a train on an endless conveyor belt for conveying them from the load position 14A to the weighing position 14B and back to the load position continuously for more rapid alignment and packaging. Also, a plurality of alignment containers 12 and associated vibrating conveyor feeders 10 can be employed which discharge into different trains weighing containers.

In view of the above, it will be obvious that many changes may be made in the above described preferred embodiment of the present invention without departing from the spirit of the invention. Therefore, the scope of the present invention should be determined by the following claims.

I claim:

1. Apparatus for aligning elongated articles, comprising:
    alignment container means for aligning a plurality of elongated articles contained within said container means with their longitudinal axes substantially parallel;
    first vibrating conveyor means for conveying said elongated articles into the alignment container means in a direction of travel which forms an acute angle with a wall of said container means;
    said first conveyor means being divided longitudinally into a plurality of tracks defined by and separated by divider partitions extending to a position above said container means and each track having a track width which is less than the average length of the articles so that said articles are prealigned longitudinally in said tracks with their longitudinal axes substantially parallel to said direction of travel;
    said alignment container means having an article inlet opening of a width less than the average length of said articles so that the majority of said articles strike the inner surface of said wall of said container means while they are in said tracks on said first conveyor means and are aligned substantially parallel with said wall before said articles drop from said first conveyor tracks directly into said container means through said inlet opening; and
    first discharge means for discharging said articles from the bottom of said container as a batch of articles in an aligned condition.

2. Apparatus in accordance with claim 1 which also includes packaging means for packaging the aligned articles into sealed packages.

3. Apparatus in accordance with claim 1 in which the alignment container is vibrated by a vibration means separate from said first conveyor at a different frequency of vibration than said first conveyor to further align and settle said articles in said alignment container.

4. Apparatus in accordance with claim 2 which also comprises weighing means including at least one weighing container and a scale for weighing the aligned articles after they are discharged as a batch from said alignment container into said weighing container;
    second vibrating conveyor means for conveying more articles into said weighing container until the weight of the articles in the filled weighing container reaches a predetermined value; and
    second discharge means for discharging the complete contents of said weighing container as an aligned batch of articles into said packaging means.

5. Apparatus in accordance with claim 4 in which the second conveyor feeds the articles into the weighing container in a direction of travel which forms an acute angle with the wall of said weighing container to align the articles added to the weighing container.

6. Apparatus in accordance with claim 4 which also includes a level detection means for detecting the level of said articles contained in said alignment container and for causing said first discharge means to discharge the contents of said alignment container into said weighing container after the level of said articles reaches a predetermined level.

7. Apparatus in accordance with claim 6 in which the level detection means includes a light source and a light detector for detecting a light beam transmitted by said light source across said alignment container at said predetermined level.

8. Apparatus in accordance with claim 4 in which the weighing container is moved from a load position beneath said alignment container where the aligned articles are discharged from said alignment container and loaded into said weighing container, to a weighing position where the weighing container is weighed on said scale.

9. Apparatus in accordance with claim 3 in which the elongated articles are french fried potatoe strips, the frequency of vibration of the alignment container is about 22 hertz and the vibration acceleration is about twice the force of gravity.

10. Apparatus in accordance with claim 1 in which the acute angle is in the range of approximately 30° to 60°.

11. Apparatus in accordance with claim 1 in which the acute angle is about 45°.

12. Apparatus in accordance with claim 4 in which the weighing container is of substantially the same rectangular cross-section as said alignment container and the package into which the articles are discharged.

13. Apparatus in accordance with claim 2 which also includes tipping means for gently tipping the sealed packages from a vertical position at the output of the packaging means to a horizontal position onto an outfeed conveyor without disturbing the alignment of the articles in said package.

14. Apparatus in accordance with claim 13 in which the tipping means includes a package support onto which the package is discharged from the packaging means, means for pivotally mounting said package support to enable said package support to tip from a vertical position to a horizontal position.

15. Apparatus in accordance with claim 14 which also includes a side plate for releasably clamping the package between said side plate and said package support in said vertical position, and cylinder means for causing said package support to tip from said vertical position to said horizontal position and to move away from said side plate to unclamp said package and discharge it onto said outfeed conveyor.

16. Apparatus in accordance with claim 15 in which the side plate is mounted to pivot about a common shaft on which the package support is also pivotally mounted by brackets to space it from said side plate in said vertical position, and said cylinder means includes a first cylinder for urging said side plate toward said package support to clamp the package therebetween and a second cylinder for tipping said package support from said vertical position to said horizontal position.

17. Method for aligning elongated articles, comprising the steps:
conveying a plurality of elongated articles on a vibrating conveyor along tracks separated by dividers in a direction of travel which forms an acute angle with a wall of an alignment container so that said articles are prealigned with their longitudinal axes substantially parallel to said direction of travel;
directing one end of said prealigned articles against the inner surface of said wall of said alignment container and causing articles to move along said wall until the longitudinal axes of said articles are aligned more parallel with said
dropping said aligned articles from said conveyor directly down into the alignmen container through an inlet opening at the top of said container;
vibrating said alignment container to further align and settle the elongated articles within said alignment container; and
discharging the aligned articles in a batch from an outlet opening in the bottom of said alignment container without disturbing their alignment.

18. Method in accordance with claim 17 which also includes the steps of packaging the aligned articles after they are discharged from the alignment container.

19. Method in accordance with claim 18 in which the level of the articles within the alignment container is detected and said articles are discharged from said container when they reach a predetermined level.

20. Method in accordance with claim 19 which also includes the steps of:
discharging the aligned articles from the outlet opening of said alignment container into a weighing container;
moving said weighing container onto a scale for weighing the contents of said weighing container;
feeding additional elongated articles into the weighing container during weighing until a predetermined weight is reached; and
discharging the aligned articles from said weighing container into a package as a batch of aligned articles after said predetermined weight is reached.

21. Method in accordance with claim 17 in which the vibration frequencies of the alignment container and the vibrating conveyor are different.

22. Method in accordance with claim 17 in which the articles are french fried potatoe strips and the frequency of vibration of the alignment container is about 22 hertz and the vibration acceleration is about twice the force of gravity.

23. Method in accordance with claim 17 in which the acute angle is in the range of approximately 30° to 60°.

24. Method in accordance with claim 17 in which the acute angle is about 45°.

25. Method in accordance with claim 20 in which the weighing container is of substantially the same cross-section as the alignment container and the package into which the articles are discharged.

26. Method in accordance with claim 20 in which the package of aligned articles is gently tipped from vertical position in which it is filled to a horizontal position onto an outfeed conveyor without disturbing the alignment of the articles.

* * * * *

UNITED STATES PATENT AND TRADEMARK OFFICE
CERTIFICATE OF CORRECTION

PATENT NO. : 4,514,959
DATED : May 7, 1985
INVENTOR(S) : DAVID SHROYER

It is certified that error appears in the above-identified patent and that said Letters Patent is hereby corrected as shown below:

Column 9, line 51 of Claim 17 insert --wall;--.

Signed and Sealed this

Twenty-sixth Day of November 1985

[SEAL]

Attest:

DONALD J. QUIGG

Attesting Officer

Commissioner of Patents and Trademarks